United States Patent

[11] 3,595,016

[72] Inventor Thomas Rowe Stockton
  Ann Arbor, Mich.
[21] Appl. No. 7,492
[22] Filed Feb. 2, 1970
[45] Patented July 27, 1971
[73] Assignee Ford Motor Company
  Dearborn, Mich.

[54] DRIVE LINE FOR A GAS TURBINE POWER PLANT
  6 Claims, 4 Drawing Figs.
[52] U.S. Cl. .................................... 60/39.16,
  60/39.14, 74/695, 74/765
[51] Int. Cl. ........................................... F02c 3/10
[50] Field of Search ............................. 60/39.16,
  39.15, 39.14

[56] References Cited
  UNITED STATES PATENTS
2,912,823  11/1959  Lawson ..................... 60/39.16

3,290,878  12/1966  Wickman .................... 60/39.16
  FOREIGN PATENTS
706,070  3/1954  Great Britain ............... 60/39.16
724,177  2/1955  Great Britain ............... 60/39.16

*Primary Examiner*—Clarence R. Gordon
*Attorneys*—John R. Faulkner and Donald J. Harrington ABSTRACT: A drive line for a gas turbine engine having an integrated diffuser, a regenerator section, a burner and gasifier section, a power turbine section and a power transmission assembly, power input elements of the power transmission assembly being connected drivably to the power turbine and power output elements thereof being connected to an output shaft extending in parallel disposition with respect to the power turbine shaft and through the gas turbine diffuser housing, the diffuser blades being modified to accommodate the output shaft whereby the overall dimensions of the engine and drive line are reduced to a minimum.

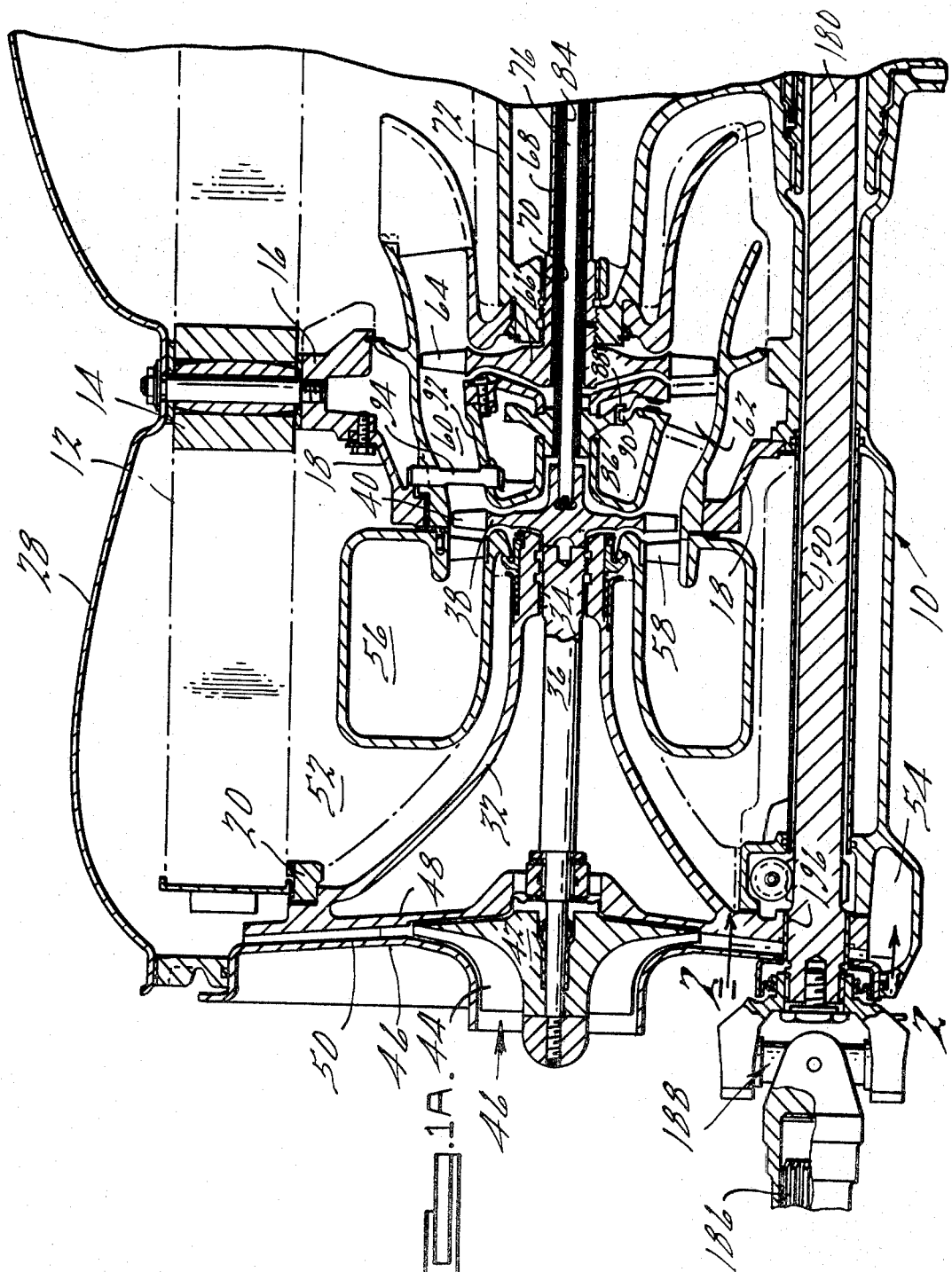

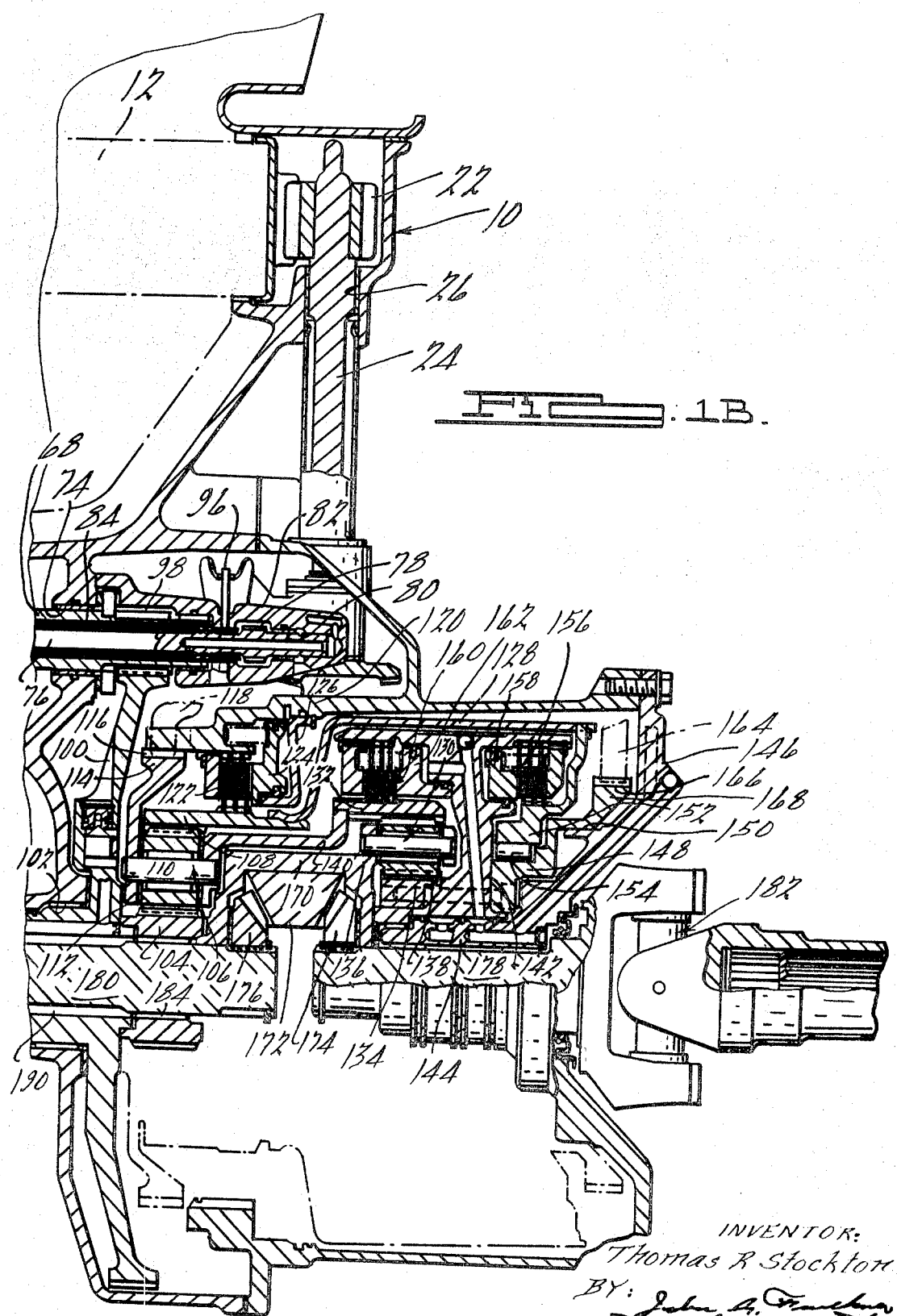

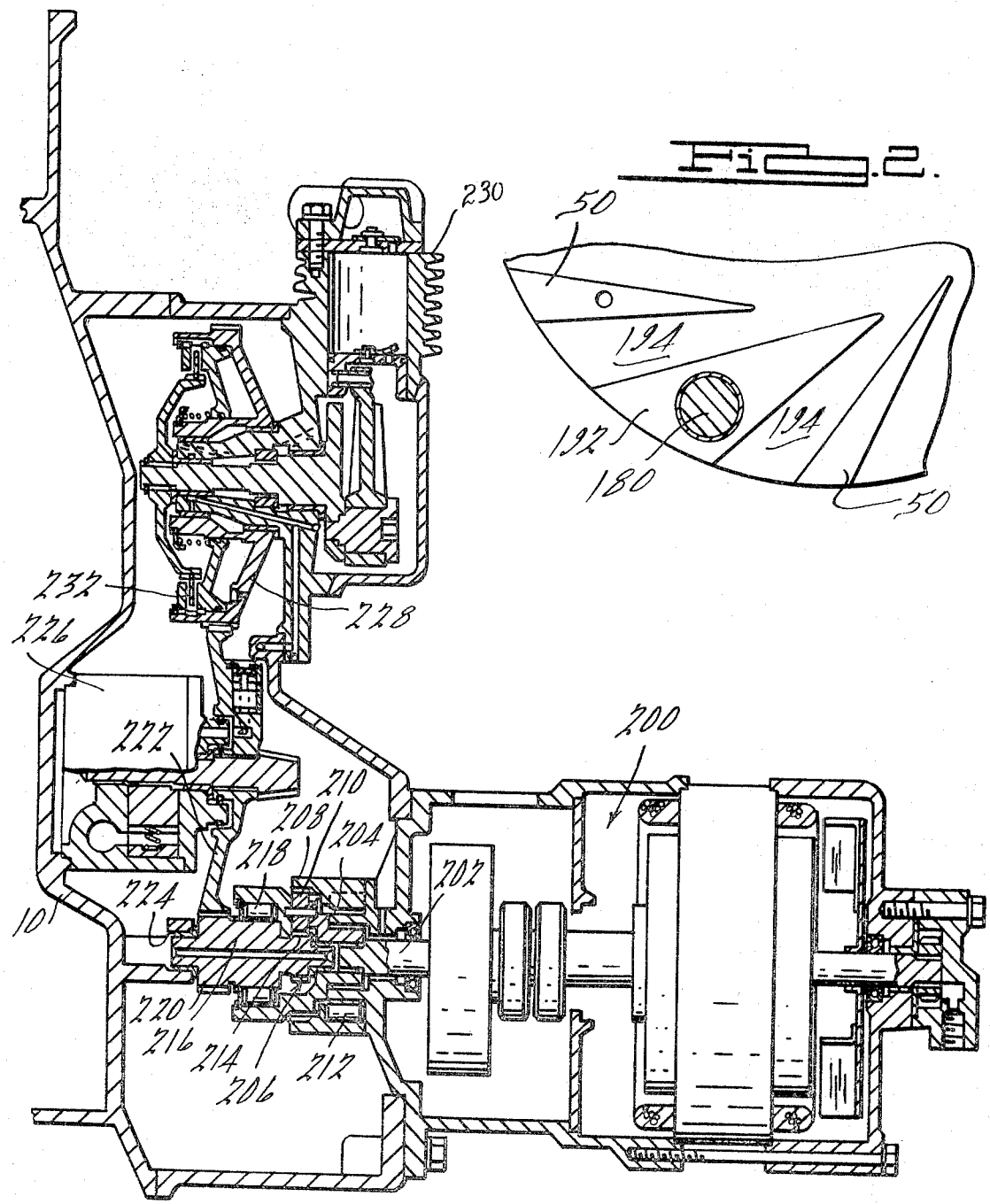

DRIVE LINE FOR A GAS TURBINE POWER PLANT

GENERAL DESCRIPTION OF THE INVENTION

My invention is adapted to be used with gas turbine powerplants wherein a diffuser, a gasifier section, a regenerator and a power turbine section are located in a common gas turbine housing. The powerplant may be used readily for powering wheeled vehicles because of the reduced road clearance made available by the compact arrangement of the torque delivery elements.

The improvements of my invention comprise a multiple ratio transmission mechanism drivably connected at its power input end to the power turbine shaft. Either one of two forward driving ratios or a single reverse ratio may be achieved by selectively controlling the relative motion of the elements of the transmission mechanism. The power output shaft of the transmission mechanism is connected to a drive shaft which is journaled within the gas turbine housing. This requires a special modification of the gas turbine diffuser section, which is used to induce air in the intake side of the engine and compress it prior to entry into the regenerator section. The diffuser comprises a centrifugal air pump driven by a gasifier section of the engine, and the air induced by the diffuser is discharged outwardly through radial flow-directing passages defined by the diffuser blades.

The integrated arrangement of the drive shaft, the transmission structure and the power elements of the gas turbine powerplant makes it possible to install the turbine and transmission system in a vehicle drive line without the necessity for reducing road clearance and without interfering with other vehicle components in the vehicle engine compartment.

The drive line arrangement of my invention makes possible the use of a simplified starter-alternator unit having a single field and armature for both the alternator unit and for the engine starter unit. Such a starter-alternator unit and the associated accessory drive form a part of my improved gas turbine and transmission assembly.

BRIEF DESCRIPTION OF THE FIGURES OF THE DRAWING

FIG. 1, consisting of FIG. 1A and FIG. 1B, shows a longitudinal cross-sectional view of a gas turbine powerplant and a power transmission assembly embodying the improvements of my invention.

FIG. 2 is a cross-sectional view taken along the plane of section line 2—2 of FIG. 1.

FIG. 3 is a view showing in cross section my improved starter-alternator accessory drive arrangement for use with the gas turbine powerplant of FIG. 1.

PARTICULAR DESCRIPTION OF THE INVENTION

In FIG. 1 reference character 10 designates the outer housing structure for the gas turbine powerplant of my invention. A rotary regenerator 12 having vertical flow passages is journaled in the upper region of housing 10. It is formed with a hub 14, which is supported by bearing support 16. This in turn is supported by an internal supporting plate 18. Plate 18 forms a wall, the periphery of which is bolted to the interior of housing 10.

An annular ring 20 carried by the upper portion of the housing 10 is arranged in sealing engagement with the margin of a rotary regenerator core 12. A periphery of the core 12 is formed with ring gear teeth which engage drivably drive pinion 22. This pinion in turn is driven by drive shaft 24 journaled in bearing opening 26 formed within housing 10. Shaft 24 is driven by the gasifier section of the power plant through a suitable gearing arrangement, not shown.

The engine is covered by a cover plate 28 which is secured to the housing 10 at a location above the regenerator core. Cover 28 forms an exhaust opening 30, through which the exhaust gases escape. The exhaust gases pass through the regenerator core 12 in an upward direction, as viewed in FIG. 1, before they pass through the exhaust port 30. This heats the core, and the heat retained in the core is transmitted to the intake air as the core rotates about its axis.

An internal supporting member 32, is secured to the housing 10 and extends axially, the effective diameter of the member 32 decreasing as it approaches the central region of the engine. Member 32 is formed with a bearing opening 34, in which is journaled a gasifier turbine shaft 36. The right hand end of shaft 36 is drivably connected to gasifier turbine 38 which is formed on its periphery with turbine blades 40. A centrifugal compressor rotor 42 is drivably connected to the other end of the shaft 36. It is formed with an axial flow section and with radial flow passages defined by blades 44. These blades induce air through an induction air opening 46, the air following axially as it enters the flow passages defined by blades 44.

The induced air is discharged outwardly between diffuser plate 46 and the end wall 48 of the member 32. The air then passes through diffuser blades 50 and into the region of the gas turbine engine above the regenerator core 12. The intake air, upon being compressed by the centrifugal compressor, passes immediately downwardly through the flow passages in the regenerator core 12 until it is received within a collecting chamber defined by an internal housing portion 52.

The air that is discharged by the diffuser is received by a plenum chamber shown in part at 54. The air then passes through the core of the rotary regenerator and is collected first within the housing portion 52 and distributed from there to the gas turbine burner section, not shown. There the air is mixed with fuel and the resultant combustion products, as they expand, are transferred into a gasifier chamber 56. Prior to entry into the axial flow region of the powerplant, stator blades 58 direct the expanded energized gases from the chamber 56 into the compressor turbine blades 40 thereby powering the centrifugal compressor. The discharge from the gasifier turbine passes through an expanding flow channel 60, and through nozzle blades 62 to the power turbine blades 64 carried by power turbine disc 66, which in turn is connected drivably to power turbine shaft 68. Shaft 68 is journaled in bearing opening 70 formed in housing support member 72, which extends axially within the powerplant housing.

The housing support member 72 extends outwardly and is joined integrally to the outer wall portion of the housing 10. Power turbine shaft 68 is journaled at the right-hand end in a bearing opening 74 in housing member 72. Shaft 68 is positioned concentrically with respect to drive shaft 76, which is connected directly at its left-hand end, the shaft 76 is connected to, or formed integrally with, drive pinion 78, which in turn is supported by bearing 80 in support member 82. This is connected directly to the housing 10. An actuator sleeve shaft 84 is situated between shafts 76 and 68 and is connected at its left-hand end to actuator disc 86. The periphery of disc 86 carries an actuator slide 88 which in turn is connected to the inward ends of actuator levers 90 to which nozzle blades 62 are connected. Levers 90 are journaled for oscillation in an inner shroud 92, which defines in part the flow passage 60. Shroud 92 is supported on support member 18 by suitable web members 94. The right-hand end of the sleeve 84 is operatively connected to servo lever 96, which in turn is actuated by a suitable fluid pressure operated actuator. The servo actuator thus can control the angular position of nozzle blade 62 to provide an optimum flow entrance angle for the power turbine 64 under varying driving conditions.

A power output pinion 98 is connected to the power turbine shaft 68. It meshes drivably with drive gear 100 journaled in a bearing opening 102 formed in the lower portion of housing 10. Gear 100 is connected directly to sun gear 104 of the first planetary gear unit 106. Unit 106 includes also a ring gear 108. Carrier 110 and planet pinions 112 journaled on carrier 110 in meshing engagement with sun gear 104 and ring gear 108. Carrier 110 includes a brake disc 114 having teeth 116 formed on its periphery. These may be engaged selectively by a pawl 118 which is pivoted for oscillation about a fixed axis. The pawl comprises a tooth that may be engaged selectively with the teeth 116 to anchor the disc 114 and the carrier 110. When the pawl is in engagement with the teeth 116, carrier 110 is capable of acting as the reaction member for the planetary gearing. The use of a pawl and disc 114 eliminates the need for providing a multiple disc brake for establishing a reaction point in the gear system.

The transmission includes a housing portion 120, which forms an integral part of the housing 10. A multiple disc brake 122 is adapted to anchor selectively the ring gear 108. It includes brake discs carried by the ring gear 108 and by the housing. The brake discs are moved into braking engagement by an angular piston 124, which cooperates with a wall 126 secured to the interior of the housing 120.

Ring gear 108 is connected to one end of a drive shell 128, which surrounds planetary gear unit 130. Gear unit 130 includes a ring gear 132, a sun gear 134, a planet carrier 126 and planet pinions 138 journaled on the carrier 136 in meshing engagement with sun gear 134 and ring gear 132. Ring gear 132 is connected drivably to carrier 110 through a drive drum 140.

Sun gear 134 is secured to a clutch member 142 which in turn is journaled for rotation on stationary sleeve shaft 144. This is connected directly to the end plate 146 for the transmission housing 10.

An overrunning brake race 148 is journaled on shoulder 150 formed in the housing end plate 146. Race 148 is connected directly to the sun gear 134 and the clutch race 152. Overrunning clutch elements 154, which may be rollers or sprags, are situated between the races 148 and 152. Race 152 is connected directly to the drive shell 128.

A clutch assembly 156 is adapted to complement the action of the overrunning clutch shown in part at 154 by locking together the races 152 and 148. It includes clutch discs carried by the member 142 and by the outer race 152, and an annular piston 158 received with an annular cylinder formed in the member 142.

A multiple disc clutch 160 is adapted to connected selectively ring gear 132 and the clutch member 142. It includes clutch discs carried by the member 142 and by the ring gear 132 and an annular piston 162 which cooperates with an annular cylinder defined in part by the member 142. When the piston is actuated, the disc clutch 160 locks the ring gear 132 to the clutch member 142.

The race 148 can be locked selectively by a pawl 164 pivoted for oscillation about an axis that is fixed with respect to the housing 10. The pawl tooth then engages teeth 166 formed on periphery of the pawl disc 168.

Carrier 136 is connected to the differential carrier 170 which carries differential pinions 172. These pinions engage side gears 174 and 176. Side gear 174 is connected directly to power output shaft 178 and side gear 176 is connected directly to power output shaft 180. The right hand end of the shaft 178 is connected to an axle shaft for one of the traction wheels for the vehicle through a universal joint 182. Shaft 180 is journaled for rotation within bearing opening 184 in sun gear 104. The left-hand end of the shaft 180 is connected drivably to axle shaft 186 through another universal joint 188.

Shaft 180 extends through an opening 190 formed in the lower portion of the main housing 10. It extends also through the region occupied by the diffuser blades 50. Because the shaft 180 has a greater thickness than the thickness of the individual diffuser blades 50, the diffuser must be modified as indicated in FIG. 2. This vane or blade 192, which is of substantially greater thickness than the adjacent blades 50.

The axial flow passage 194 between the blades 192 and the adjacent blades 50 is of a profile that is substantially the same as the profile of the flow passages defined by the other blades 50. There is no flow irregularity established by reason of the presence of the output shaft 180 in the diffuser zone. Because of the lack of such a discontinuity, flow disturbances in the region of the compressor, as well as in the region of the plenum chamber 54, are not developed. Such flow disturbances would of necessity reduce the efficiency of the unit.

Shaft 180 extends through an opening 196 in the diffuser and is supported in the opening by a suitable bushing as indicated in both FIG. 1 and FIG. 2.

Because of the design of the diffuser, it is possible to locate the shaft 180 relatively close to the axis of rotation of the gasifier turbine and the power turbine thereby reducing the vertical dimensions of the assembly.

In FIG. 3, I have illustrated an accessory drive for a starter-alternator unit for the gas turbine powerplant in FIG. 1, as well as other accessories such as the engine pump, the transmission lubrication pump, the power steering pump and the air-conditioning compressor.

When the electrical unit shown in FIG. 3 is operated as a starter motor, the accessory drive establishes a direct drive connection with the gasifier drive gear, which in turn meshes directly with the gear 78 shown in FIG. 1. Gear 78, in turn is carried by the gasifier turbine shaft 76.

The starter-alternator unit is illustrated in FIG. 3 at 200. It includes an armature shaft 202 which is connected directly to the carrier 204 of the planetary gearing 206. Ring gear 208 of of the gear unit 206 meshes with planet pinions 210 carried by the carrier 204, turbine overrunning brake 212 inhibits rotation of the ring gear 208 in one direction but permits freewheeling motion of the ring gear in the opposite direction. Sun gear 214 for the gearing 206 is connected to the output element 216 of the gear unit or clutch 218 establishes a one-way driving connection between the carrier 204 and the output element 216. Output element 216 forms a drive pinion 220 which meshes drivably with the gear 222, which in turn meshes with the previously described gasifier drive pinion 78. Output element 216 is journaled rotatably in bearing opening 224 formed in a The compressor support carried by the housing structure 10.

When the gear 222 is driven, the gasifier turbine also is driven. A combined oil pump for the engine lubrication system, the transmission lubrication system and the power-steering gear is illustrated at 226. It is connected drivably to the gear 222. The gear 222 meshes also with drive gear 228 for an air-conditioning compressor 230. The compressor 230 is connected to the gear 228 through selectively engageable friction clutch 232, which is under the control of a suitable control mechanism.

When the unit 200 is acting as a driving motor, armature torque is delivered from shaft 202 to the carrier 204 and then directly through the overrunning clutch 218 to the gear 220. This drives the gasifier drive gear 222. After the gas turbine powerplant is operating, the direction of the torque delivered through the gearing 206 is reversed. Under these conditions, the gear 220 acts as a power input element and the overrunning clutch 218 freewheels. The overrunning brake 212 anchors the ring gear 208 under these conditions, and a speed reduction occurs as the sun gear 214 drives the carrier 204. Carrier 204, in turn drives armature 202 for the unit 200 which now acts as an alternator or voltage generator.

To establish a low speed ratio drive condition during operation when torque is applied to the power driven shaft 68, the brake 122 is applied thereby allowing the gear 108 to act as a reaction point. Sun gear 104 which is driven by the gear 100, drives carrier 110 at a reduced speed ratio. The motion of the carrier is transmitted to the ring gear 132. This tends to drive the carrier 136 with the sun gear 134 acting as a reaction point. Sun gear 134 is held stationary because it is anchored by the overrunning clutch 154 and by stationary race 152, the latter being held against rotation by the engaging clutch 160. This locks together the elements of the planetary gear unit 130. Reverse drive is achieved by engaging the pawl 118 thereby anchoring the carrier 110 that causes ring gear 108 to be rotated in a reverse direction. Since the brake 122 is released, sun gear 134 is now driven in a reverse direction by reason of the driving connection between sun gear 134 and the ring gear 108 through the engaged clutch 156. Ring gear 132 is held stationary since it is connected directly to the anchored carrier 110.

Having thus described a preferred form of my invention, what I claim and desire to secure by U.S. Letters Patent is:

1. A gas turbine powerplant and transmission assembly comprising a main housing, a centrifugal compressor in said housing, a gasifier turbine drivably connected to said compressor, a power turbine in axial disposition with respect to said gasifier turbine, a power turbine shaft mounted for rotation about an axis that is common to the axis of said compressor, a planetary transmission in a portion of said housing remotely situated with respect to said compressor, diffuser vanes arranged in said housing in the radially outward region of said compressor, gearing drivably connecting said power turbine shaft with power input elements of said transmission, a power output shaft connected to driven elements of said transmission and extending through said housing, said output shaft being journaled at spaced portions of said housing and arranged in parallel disposition with respect to said power turbine shaft axis, the spacing of said power output shaft from said power turbine shaft axis being less than the radial distance from said axis to the outermost portions of said diffuser vanes, one of said diffuser vanes having an arcuate thickness that is substantially greater than the corresponding thickness of the adjacent diffuser vane, and an opening formed in said enlarged diffuser vane, said power output shaft being received in said opening and extending therethrough to the exterior of said housing.

2. The combination set forth in claim 1 wherein said transmission assembly comprises a pair of planetary gear units, each gear unit comprising a ring gear, a sun gear, a carrier and planet pinions carried by said carrier in meshing engagement with said sun and ring gears, the sun gear of the first of said units being connected drivably to the power turbine, means for anchoring the carrier of said first gear unit during reverse drive range operation, selectively engageable brake means for anchoring the ring gear of the first gear unit during low speed ratio operation whereby said ring gear acts as a reaction point, means for connecting drivably the ring gear of said first unit and the sun gear of the second gear unit during low speed ratio operation, the carrier of the second gear unit being connected drivably to said power output portion of said assembly and the means for connecting together two elements of said second gear unit for rotating in unison during high-speed operation.

3. The combination as set forth in claim 2 wherein the means for connecting the ring gear of said first gear unit and the sun gear unit of said second gear comprises an overrunning clutch, said overrunning clutch having an outer race connected to the ring gear of the first gear unit and an inner race connected to the sun gear of the second gear unit, said overrunning clutch accommodating torque distribution from the ring gear of the first gear unit to the sun gear of the second gear unit but preventing torque distribution in the opposite direction.

4. The combination set forth in claim 3 wherein the means for connecting the ring gear of the first gear unit and the sun gear of the second gear unit includes, in addition to said overrunning clutch, a selectively engageable friction clutch adapted to establish a bypass torque flow path around said overrunning clutch thereby accommodating torque distribution in both directions between the ring gear of the first gear unit and the sun gear of the second gear unit.

5. The combination set forth in claim 3 wherein the brake means for the carrier of the first gear unit comprises a pawl carried by said housing, a pawl disc having external teeth on the carrier, the pawl being engageable with said teeth to establish a reaction point for said carrier of said first gear unit, sun gear for the second gear unit and the inner race for said overrunning clutch including a second pawl disc with external teeth formed thereon, said external teeth being adapted to engage a second pawl to establish a locked condition when it and said previously mentioned pawl engage simultaneously.

6. The combination set forth in claim 4 wherein the brake means for the carrier of the first gear unit comprises a pawl carried by said housing, a pawl disc having external teeth on the carrier, the pawl being engageable with said teeth to establish a reaction point for said carrier of said first gear unit, sun gear for the second gear unit and the inner race for said overrunning clutch including a second pawl disc with external teeth formed thereon, said external teeth being adapted to engage a second pawl to establish a locked condition when it and said previously mentioned pawl engage simultaneously.